United States Patent
Kubala et al.

(10) Patent No.: US 9,828,258 B2
(45) Date of Patent: Nov. 28, 2017

(54) METHOD FOR TREATMENT OF DRILL CUTTINGS

(71) Applicant: TERRA-HYDROCHEM, INC., Austin, TX (US)

(72) Inventors: Roger Kubala, Austin, TX (US); Robert Sloan, Austin, TX (US)

(73) Assignee: Terra-Hydrochem, Inc., Austin, TX (US)

( * ) Notice: Subject to any disclaimer, the term of this patent is extended or adjusted under 35 U.S.C. 154(b) by 0 days.

(21) Appl. No.: 15/110,339

(22) PCT Filed: Jan. 9, 2015

(86) PCT No.: PCT/US2015/010902
§ 371 (c)(1),
(2) Date: Jul. 7, 2016

(87) PCT Pub. No.: WO2015/106159
PCT Pub. Date: Jul. 16, 2015

(65) Prior Publication Data
US 2016/0326020 A1 Nov. 10, 2016

Related U.S. Application Data

(60) Provisional application No. 61/925,585, filed on Jan. 9, 2014, provisional application No. 61/942,555, filed
(Continued)

(51) Int. Cl.
*C02F 1/40* (2006.01)
*C02F 1/72* (2006.01)
(Continued)

(52) U.S. Cl.
CPC .............. *C02F 1/24* (2013.01); *C02F 1/40* (2013.01); *C02F 1/72* (2013.01); *C02F 1/727* (2013.01); *E21B 21/066* (2013.01); *E21B 21/068* (2013.01); *C02F 2101/12* (2013.01); *C02F 2101/306* (2013.01); *C02F 2101/32* (2013.01); *C02F 2101/34* (2013.01);
(Continued)

(58) Field of Classification Search
None
See application file for complete search history.

(56) References Cited

U.S. PATENT DOCUMENTS 4,482,459 A    11/1984   Shiver
5,006,239 A *   4/1991   Mishra .................. B01D 17/00
                                                                                                                  210/181
(Continued)

FOREIGN PATENT DOCUMENTS

WO      1990009507 A1    8/1990
WO      2008050138 A1    5/2008

*Primary Examiner* — Thomas M Lithgow
(74) *Attorney, Agent, or Firm* — Gregory L. Porter; Andrews Kurth Kenyon LLP

(57) ABSTRACT

The present invention pertains to a process for treating drill cuttings. The process involves mixing the drill cuttings with an aqueous emulsion comprising one or more oil-liquid membranes surrounding a nano scale compound comprising iron, magnesium, or both. The weight ratio of emulsion to water is from about 1:150 to about 1:3000 and the volume ratio of water to drill cuttings is from about 40:60 to about 70:30. The treated drill cuttings can then be removed.

13 Claims, 18 Drawing Sheets

Related U.S. Application Data on Feb. 20, 2014, provisional application No. 61/980,351, filed on Apr. 16, 2014.

(51) Int. Cl.
*C02F 1/24* (2006.01)
*E21B 21/06* (2006.01)
*C02F 101/12* (2006.01)
*C02F 101/32* (2006.01)
*C02F 103/10* (2006.01)
*C02F 101/30* (2006.01)
*C02F 101/34* (2006.01)
*C02F 101/36* (2006.01)

(52) U.S. Cl.
CPC ...... *C02F 2101/36* (2013.01); *C02F 2101/40* (2013.01); *C02F 2103/10* (2013.01); *C02F 2305/04* (2013.01); *C02F 2305/08* (2013.01)

(56) References Cited

U.S. PATENT DOCUMENTS

| | | | |
|---|---|---|---|
| 6,664,298 B1* | 12/2003 | Reinhart | B01D 17/0202 252/178 |
| 7,611,637 B2* | 11/2009 | Zhang | B09C 1/002 204/157.15 |
| 7,963,720 B2* | 6/2011 | Hoag | B09C 1/002 405/128.75 |
| 2006/0186056 A1* | 8/2006 | Ivan | B01D 17/047 210/704 |
| 2011/0272348 A1* | 11/2011 | Ramsburg | A62D 3/37 210/601 |
| 2012/0090898 A1 | 4/2012 | Ross et al. | |

* cited by examiner

| METHOD: 8260B - VOC'S | Q-1 | Q-2 | Q-3 | Q-4 |
|---|---|---|---|---|
| CHLOROBROMOMETHANE | 1.8 U | 8.9 U | 1.8 U | 1.8 U |
| CARBON TETRACHLORIDE | 1.1 U | 5.7 U | 1.1 U | 1.1 U |
| DIBROMOCHLOROMETHANE | 0.94 U | 4.7 U | 0.94 U | 0.94 U |
| CHLOROBENZENE | 0.96 U | 4.8 U | 0.96 U | 0.96 U |
| CHLOROETHANE | 1.4 U | 7.0 U | 1.4 U | 1.4 U |
| CHLOROFORM | 0.66 U | 3.3 U | 0.66 U | 0.66 U |
| CHLOROMETHANE | 1.7 U | 8.3 U | 1.7 U | 1.7 U |
| 1,1-DICHLOROETHANE | 0.87 U | 4.4 U | 0.87 U | 0.87 U |
| 1,2-DICHLOROETHANE | 0.90 U | 4.5 U | 0.90 U | 0.90 U |
| 1,1-DICHLOROETHENE | 1.2 U | 6.1 U | 1.2 U | 1.2 U |
| CIS-1,2-DICHLOROETHENE | 0.83 U | 4.2 U | 0.83 U | 0.83 U |
| TRANS-1,2-DICHLOROETHENE | 1.1 U | 5.7 U | 1.1 U | 1.1 U |
| 1,2-DICHLOROETHANE | 0.71 U | 3.6 U | 0.71 U | 0.71 U |
| CIS-1,3-DICHLOROPROPENE | 0.54 U | 2.7 U | 0.54 U | 0.54 U |
| TRANS-1,3-DICHLOROPROPENE | 0.58 U | 2.9 U | 0.58 U | 0.58 U |
| METHYLENE CHLORIDE | 2.2 U | 11 U | 2.2 U | 2.2 U |
| 1,1,2,2-TETRACHLOROETHANE | 0.87 U | 4.4 U | 0.87 U | 0.87 U |
| TETRACHLOROETHENE | 0.71 U | 3.6 U | 0.71 U | 0.71 U |
| 1,1,1-TRICHLOROETHANE | 0.74 U | 3.7 U | 0.74 U | 0.74 U |
| 1,1,2-TRICHLOROETHANE | 0.73 U | 3.7 U | 0.73 U | 0.73 U |
| TRICHLOROETHENE | 1.4 U | 7.0 U | 1.4 U | 1.4 U |
| VINYL CHLORIDE | 0.90 U | 4.5 U | 0.90 U | 0.90 U |
| BROMODICHLOROMETHANE | 0.66 U | 3.3 U | 0.66 U | 0.66 U |
| 1,2-DICHLOROETHENE, TOTAL | 1.9 U | 9.5 U | 1.9 U | 1.9 U |
| TOTAL CHLORIDES- RIDES 91-3,000 | | | | |

FIG. 5B

| METHOD: TEXAS - 1005 - TPH'S | | | | | |
|---|---|---|---|---|---|
| ANALYTE (ppm) | TRRC MAX LEVEL | Q-1 | Q-2 | Q-3 | Q-4 |
| C6-C12 | | 260 | 120 | 90 | 15 |
| >C12-C28 | | 5000 | 2500 | 1800 | 410 |
| >C28-C35 | | 41 U | 20 U | 20 U | 4.1 U |
| C6-C35 RULE 91 | 10,000 | 5200 | 2600 | 1800 | 430 |
| METHOD: 6010B - METALS - ANALYTE (ppm) | | | | | |
| ARSENIC | 24.2 | 5.6 | 5.3 | 4.7 | 4.6 |
| BARIUM | 8,000 | 1900 B | 2000 B | 2100 B | 2000 B |
| CHROMIUM | 30,000 | 4.7 | 4.7 | 4.6 | 4.4 |
| LEAD | 500 | 19 B | 16 B | 16 B | 14 B |
| SELENIUM | 310 | 0.33 J | 0.27 J | 0.25 U | 0.25 U |
| METHOD: GENERAL CHEMISTRY ANALYTE | | | | | |
| HEM (OIL AND GREASE) | 10,000 | 6600 B | 650 B | 620 B | 1500 B |
| (1) LEVELS SET BY RULE 91 | | | | | |
| (2) HEM ANALYSIS REQUIRED FOR PIT PERMIT ONLY | | | | | |

*FIG. 5C*

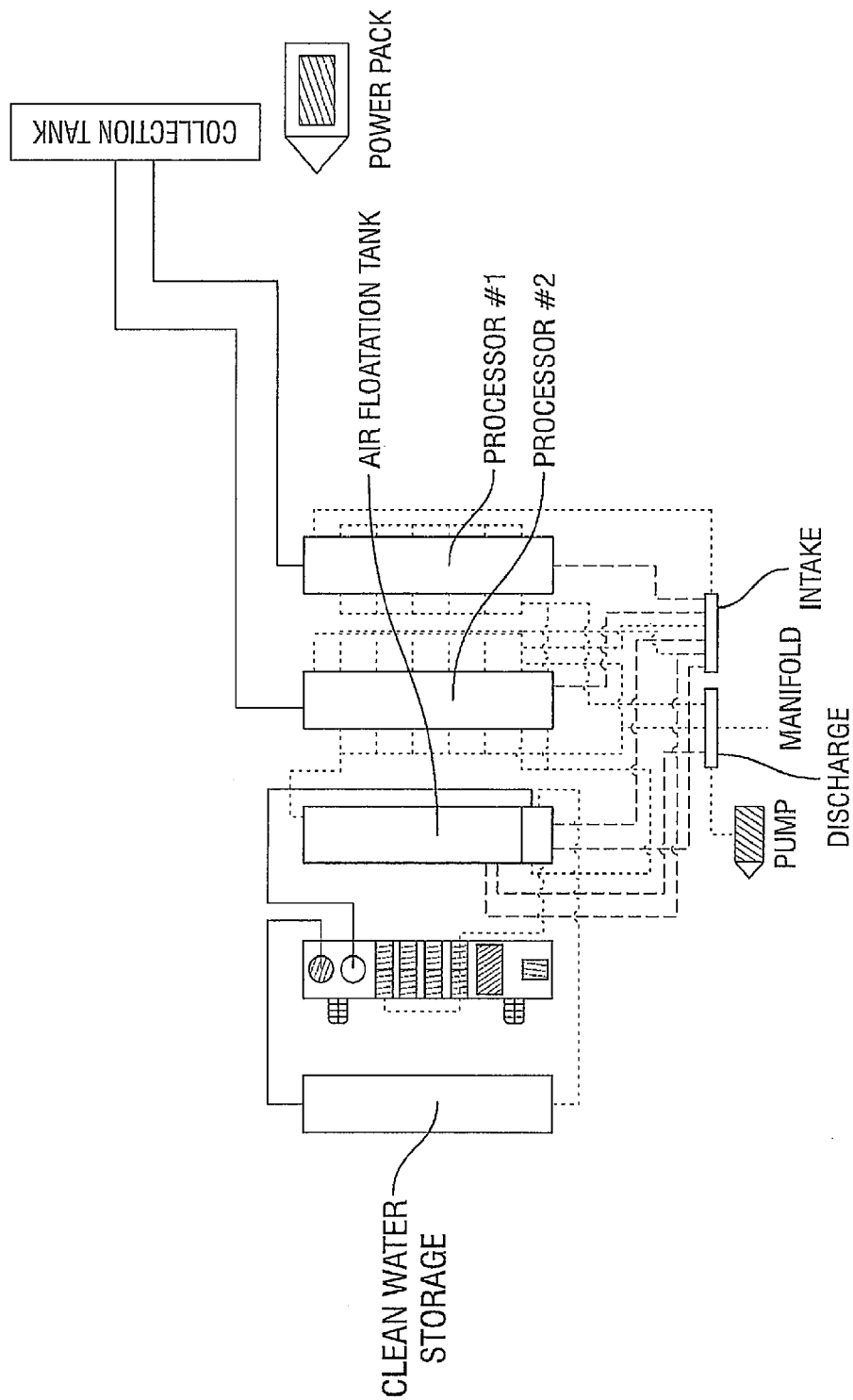

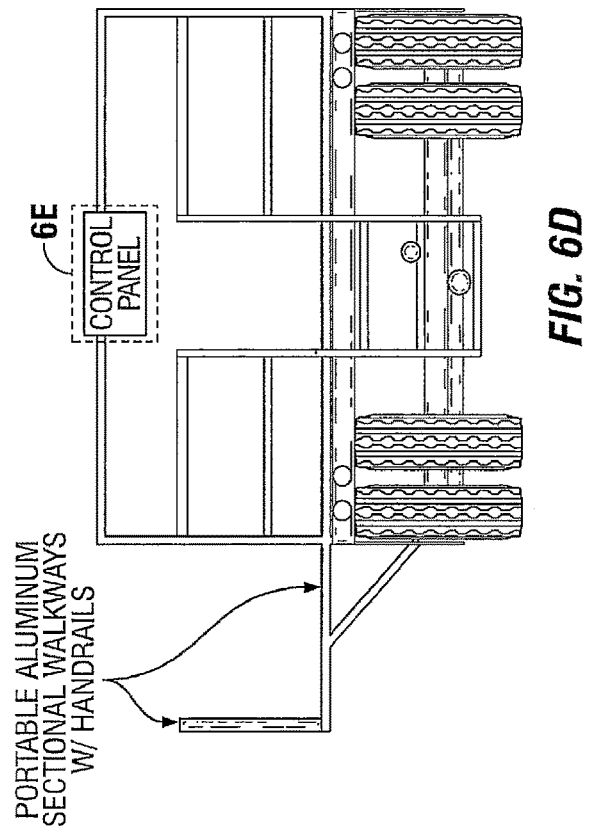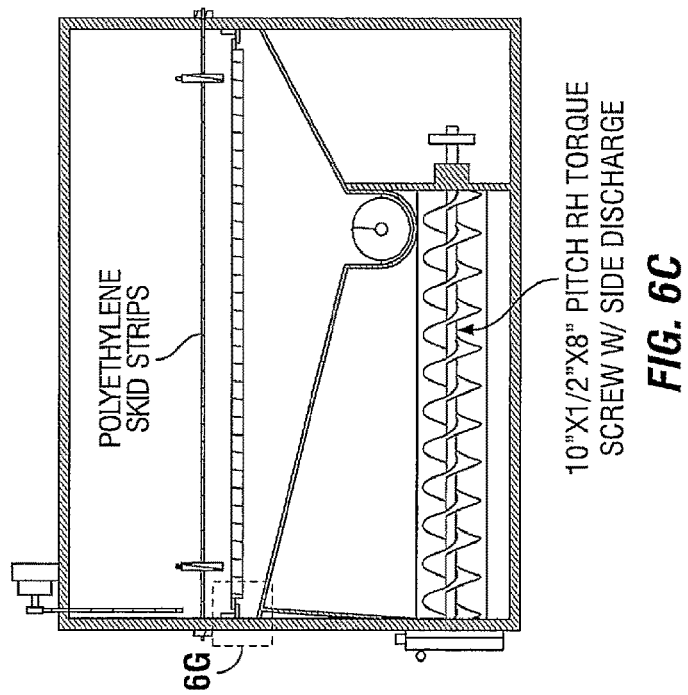

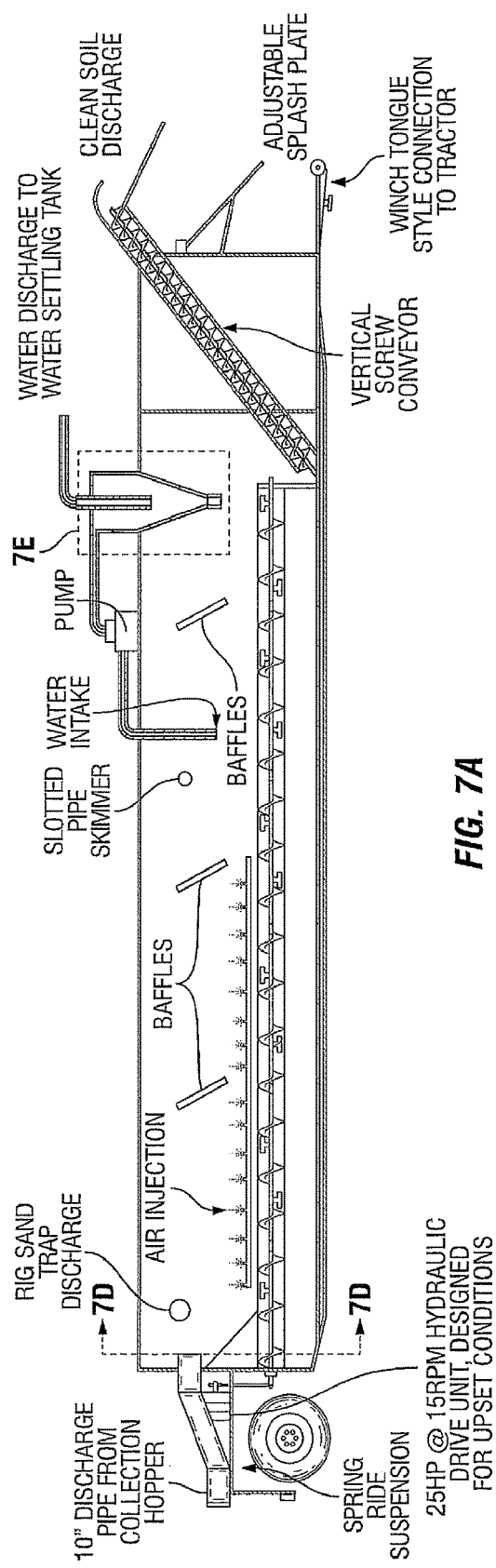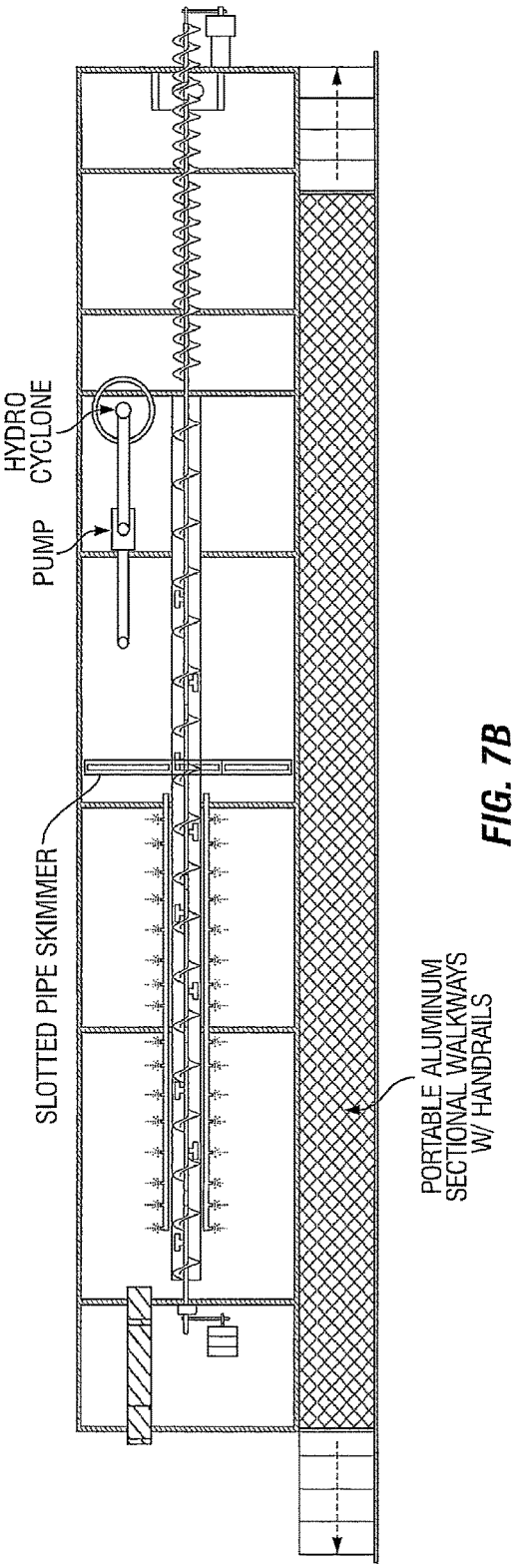
FIG. 7A
FIG. 7B

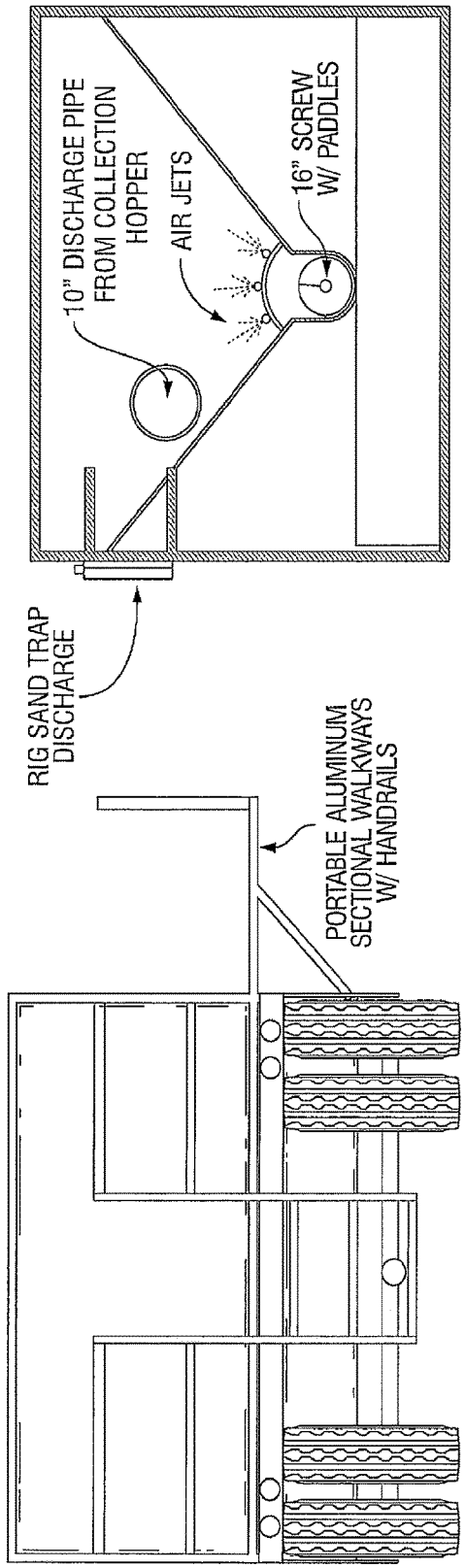
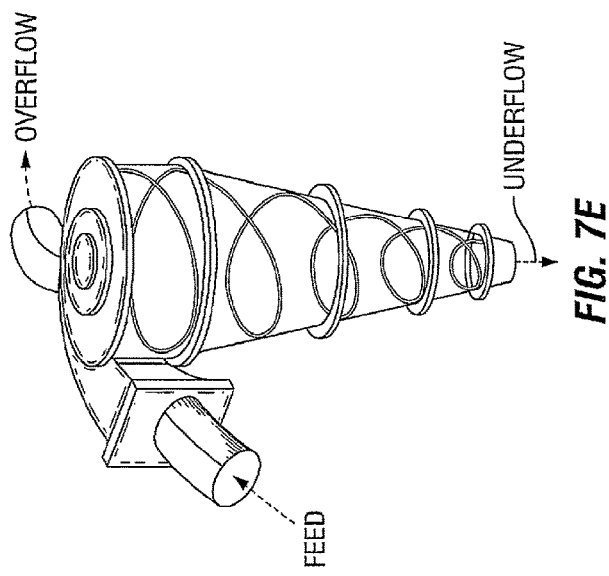
FIG. 7C
FIG. 7D
FIG. 7E

METHOD FOR TREATMENT OF DRILL CUTTINGS

FIELD OF THE INVENTION

The present invention relates to a method for treating drill cuttings from oil and gas operations to reduce contaminant content and recycle wash water.

BACKGROUND AND SUMMARY OF THE INVENTION

Oil and gas drill operations, both onshore and offshore, generate drill cuttings that require disposal. In offshore operations, cuttings may be ground up into slurry and re-injected into a waste well for disposal. More commonly, the cuttings are placed in transport boxes or containers and transported to shore for disposal which is usually expensive and time consuming. Onshore, drill cuttings are transported to a designated disposal site where the cuttings may require even additional treatment prior to land farming. Moreover, such onshore operations typically employ a plastic lined earthen reserve pit to temporarily store waste mud and drill solids until final disposal. Unfortunately, in particularly arid areas, a considerable amount of evaporation may occur which could release volatile emissions.

Drill cuttings, are mostly composed of mineral substances found in the ground, mixed with drilling fluid which may contain hydrocarbons, water and various additives. The amount of drill cuttings produced varies depending upon many factors. However, in general, drill operations often produce from one to two cubic meters of drill solids per meter drilled.

With the increase in horizontal drilling for shale plays, oil base mud is becoming more widely used in drilling the horizontal section of the well. Cuttings from such horizontal drilling operations may comprise up to 15% or even more hydrocarbons by volume. In addition, these oil based muds are often emulsified as an invert mud and therefore may also contain 20-30% or more chloride salts in solution such as calcium chloride. Typically, these chloride containing drill cuttings must be remediated for a number of reasons including regulatory reasons prior to disbursing or disposal. That is because unlike hydrocarbons which biodegrade over time chlorides may accumulate in the soil and lead to various environmental contamination issues.

Moreover, even though hydrocarbons may biodegrade over time, higher molecular weight hydrocarbons are usually slower to biodegrade than lower weight compounds. Unfortunately, these higher molecular weight hydrocarbons may reduce the ability of soil to support plant life or a variety of organisms.

For the above reasons, land treatment sites comprising drill cuttings usually must be monitored closely. Specifically, the physical and chemical composition of the wastesoil mixture are monitored, as well as, composition of runoff. The frequency and specifics of the monitoring may vary depending upon site topography, hydrology, and In some cases oil base drill cuttings are subjected to thermal desorption in order to reducing the hydrocarbon content. While the hydrocarbon content may be reduced via thermal sorption, such a treatment generally not address chlorides. Moreover, the process is expensive and has limited throughput, for example, less than two tons per hour in many cases. What's more, regardless which one or combination of the aforementioned methods are employed the cuttings still must be transported to a disposal site which further adds to the cost.

New processes for treatment of drill cuttings are needed. It would be beneficial if such processes reduced both chloride and hydrocarbon content effectively and efficiently. It would further be beneficial if such process reduced and/or eliminated the necessity of land farming or spreading and associated transportation, offshore cuttings transportation, cuttings grinding and re-injection, and the need for a reserve pit. It would be further beneficial if such new processes were capable of recycling water and reduced the need, cost and transport for the next well operations.

Advantageously, the present invention often meets all the aforementioned needs and more. In one embodiment the invention relates to a process for treating drill cuttings from an oil or gas operation. The process comprises first mixing the drill cuttings with an aqueous emulsion comprising one or more oil-liquid membranes surrounding a nano scale compound comprising iron, magnesium, or both. The weight ratio of emulsion to water is from about 1:150 to about 1:3000 while the weight ratio of water to drill cuttings is from about 40:60 to about 70:30. Next, any hydrocarbons may be skimmed and treated drill cuttings may be removed. If desired, water may be oxidized.

BRIEF DESCRIPTION OF THE DRAWINGS

FIGS. 5a-5f describe an exemplary process and results.
FIGS. 6a-6g show various views of an exemplary collection box also referred to as collection hopper, and the control panel.
FIGS. 7a-7e show various views of an exemplary processor also referred to as cuttings processing tank.

DETAILED DESCRIPTION

Figure 1:
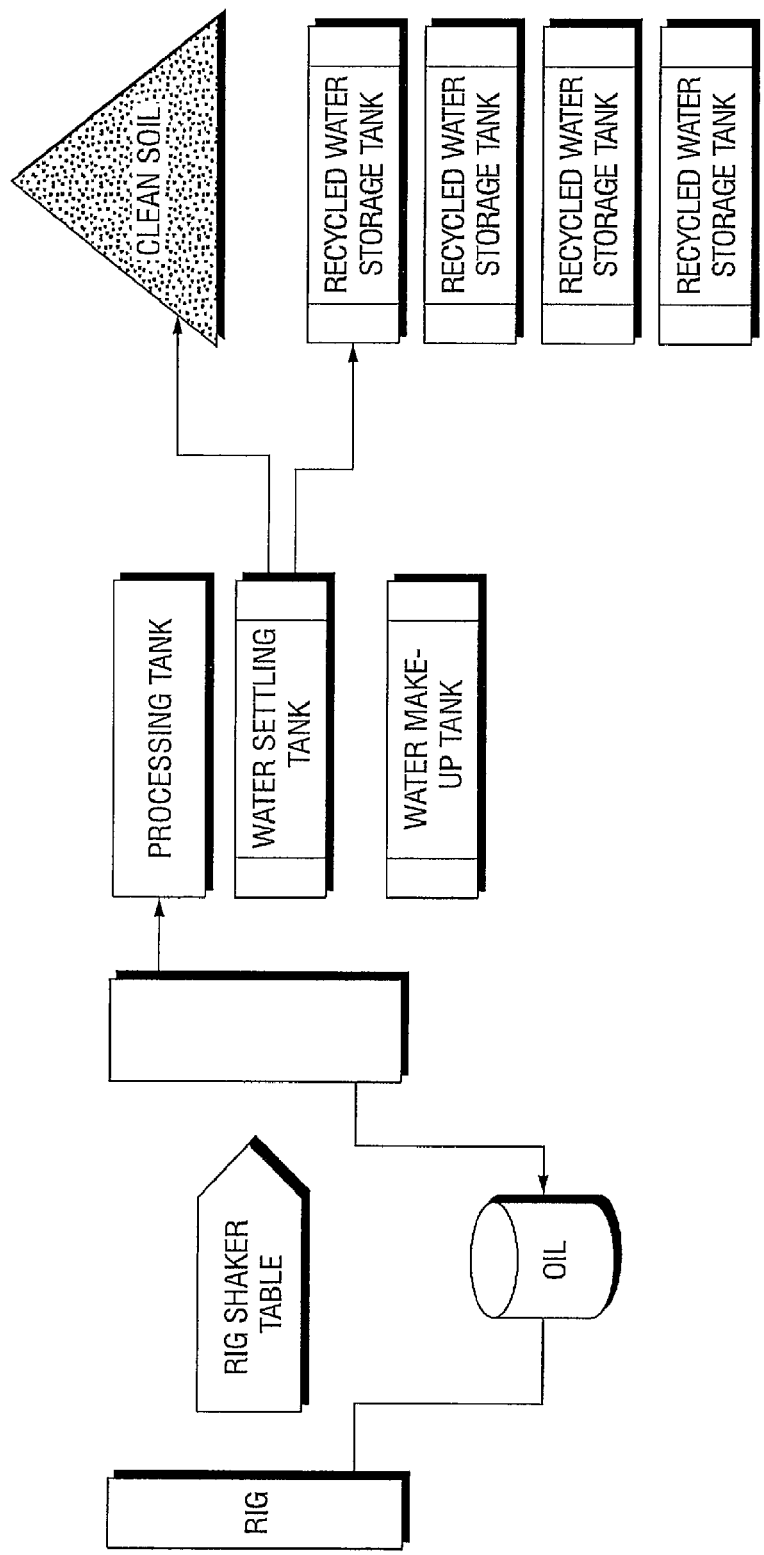
FIG. 1 shows an exemplary process flow diagram.
Figure 2:
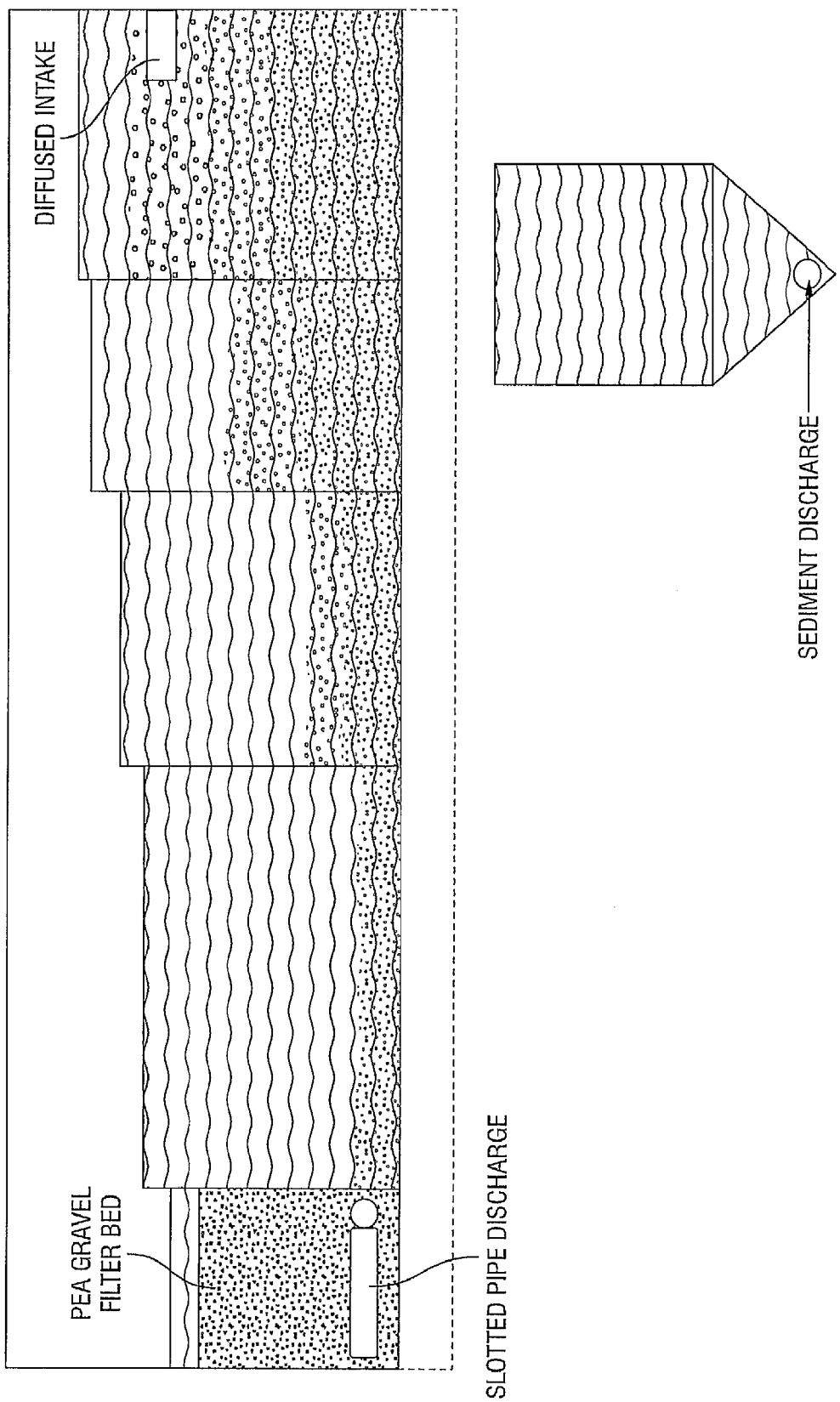
FIG. 2 shows an exemplary settling tank.
Figure 3A:
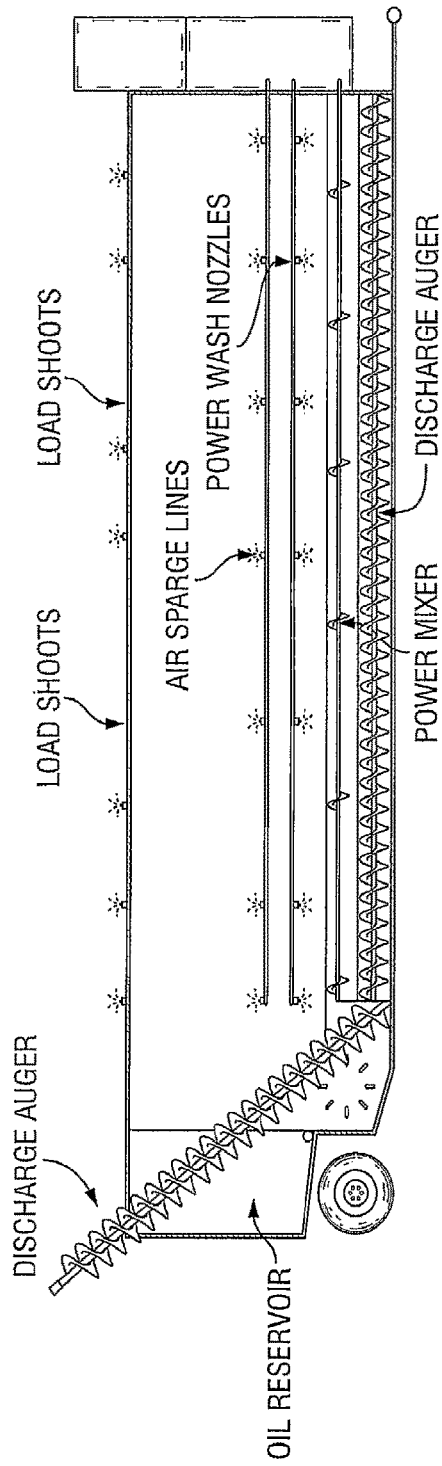
FIGS. 3a-3b show an exemplary cuttings processing tank.
Figure 3B:
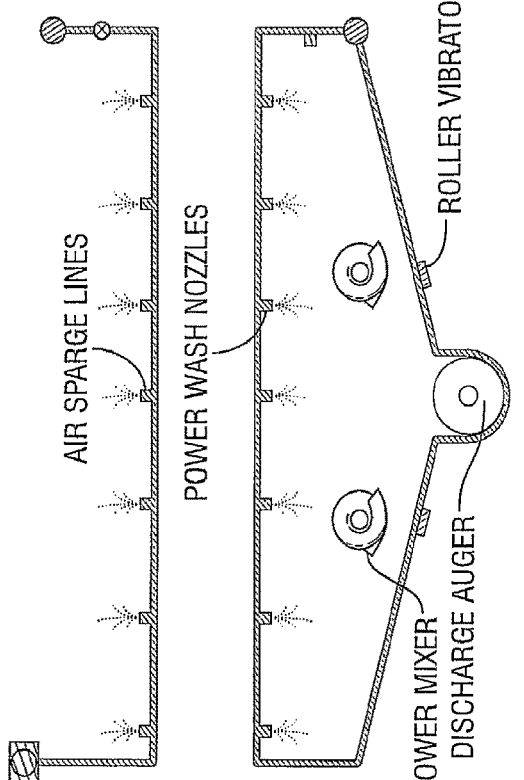
Figure 4A:
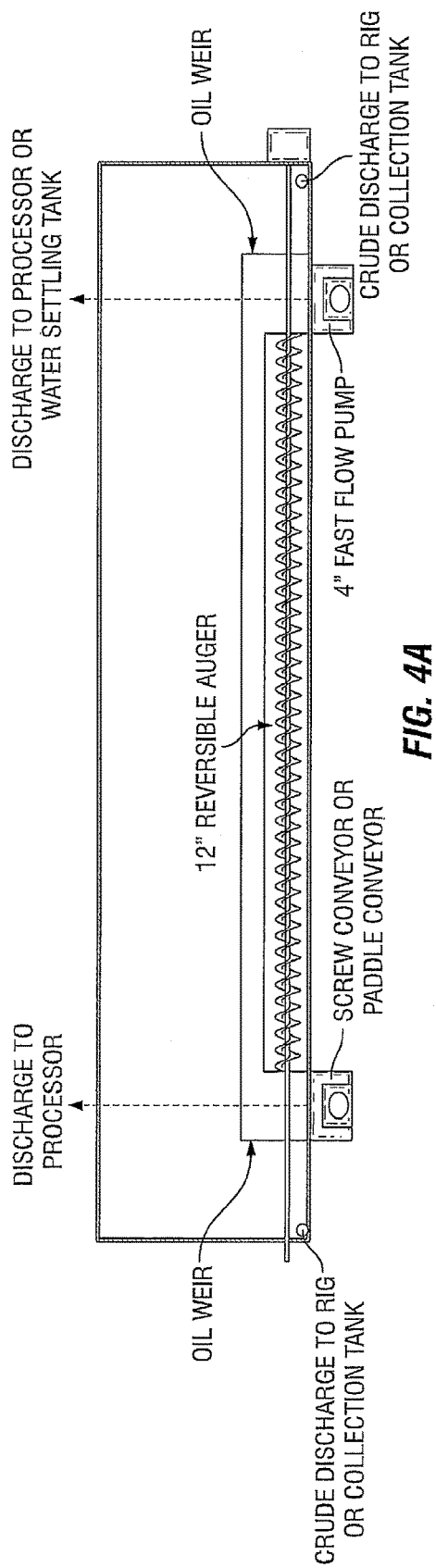
FIGS. 4a-4b show an exemplary collection box.
Figure 4B:
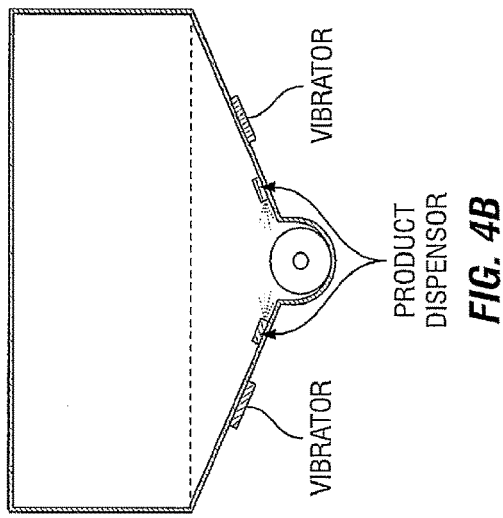

In one embodiment the invention relates to a process for treating drill cuttings. The source and type of drill cuttings is not particularly important so long as they are capable of being treated by the present invention. Typical drill cuttings are from an oil or gas drilling operation and contains chlorides, TDS (total dissolved solids), heavy metals, volatile organo-chlorides (VOC's), water soluble organics, and/or petroleum hydro-carbons (PHC's) which are capable of being reduced or removed with the present inventions. Typical drill cuttings often have one or more contaminants which may be reduced or removed by the processes of the present invention. Such contaminants may include, but are not limited to, boron, barium, chlorides, dissolved solids, iron, lead, and/or cadmium. The amounts of each, if present, vary depending upon the drill cuttings to be treated. Typical drill cuttings vary widely with respect to total dissolved solids but may range from 300 to 250,000 ppm or more. Using the processes of the invention one may reduce these as much as desired and typically below about 3000, or even below about 500 ppm, or below 300 ppm if desired.

The drill cuttings are first contacted with an aqueous emulsion. However, before doing so or simultaneously therewith it may be desirable to remove at least a substantial portion of any floating oil or hydrocarbons, solids, or mixtures thereof from the waste water. The specifics of such removal are not particularly critical and thus may be accomplished in any convenient manner to form a pre-treated mixture of drill cuttings and aqueous emulsion that is substantially free of floating oil and solids. Convenient manners of such removal may include, for example, mechanical methods such as sifting, skimming, or filtration, as well as, using adsorbents and the like.

In addition, before contacting the drill cuttings with the emulsion or simultaneously therewith it may also be beneficial to conduct a simple oxidation or other treatment of the drill cuttings. In this manner, a majority of readily removable water phase PHC's, chlorides, boron, barium and transitional metals (such as iron, lead, cadmium, etc.) are reduced and/or removed. If desired, total suspended solids and iron may also be reduced and/or removed prior to contacting the drill cuttings with the emulsion.

The drill cuttings are contacted with the aqueous emulsion in any convenient manner and such method of contact may vary depending upon the specific equipment, specific cuttings composition, and specific emulsion. Advantageously, the processes are useful over a wide range of temperatures. Typically, the temperatures employed are such that the emulsion is readily capable of pumped. Depending upon the specific emulsion such temperature is usually at least about 50, or at least about 60, or at least about 65° F. On the other hand, the temperatures are not so high that the water evaporates or the emulsion degrades prior to functioning properly. Because the cuttings may contain salts, the aqueous emulsion's boiling point may be higher than conventional water upon being mixed with the cuttings. In this manner, temperatures as high as 300° F. may sometimes be employed if desired. Typically, the temperatures employed are below about 200, or below about 180, or below about 170° F. The wide useful temperature range is advantageous in that cuttings can usually be contacted directly with the emulsion without requiring any temperature modification or monitoring.

In one embodiment, drill cuttings are taken from, for example, solids control equipment on the drilling mud system. This may be, for example, a shaker screen and/or other process equipment. The drill cuttings are provided to a vessel. The vessel is typically an open or closed vessel of any shape and dimensions. The aqueous emulsion may be introduced prior to, simultaneous with, or subsequent to the introduction of the drill cuttings into the vessel. That is, the manner of contact is not particularly critical so long as the aqueous emulsion and drill cuttings are subsequently mixed appropriately. Such mixing will necessarily vary depending upon the selected equipment but is usually mechanical mixing such as with a paddle, auger, or other stirring mechanism. Alternatively, in the case of, for example, a conveyor to deliver the cuttings appropriate mixing may occur simply by virtue of the turbidity caused by the conveying cuttings through the aqueous emulsion. Alternatively, mixing by, for example, a static mixer with some sort of dedicated path may be employed. In any event, it is usually desired at least initially to avoid introducing air and typically drill cuttings are mixed below the water level with, for example, paddles or augers. In this manner, oil and hydrocarbons often separate and float to the surface where they can be skimmed and/or removed by other means.

The weight ratio of emulsion to water in the aqueous emulsion, i.e, wash solution, varies depending upon the composition of the cuttings, emulsion, desired final product, and other conditions. It has been found that weight ratios of emulsion to water of at least about 1:150, or at least about 1:250, or at least about 1:750, or at least about 1:1000, or at least about 1:1250 are often useful. On the other hand, weight ratios of emulsion to water of less than from about to about 1:3000, or less than about 1:2500, or less than about 1:2000 are useful.

The weight ratio of wash solution (which is mostly water) to drill cuttings varies depending upon composition of wash solution, drill cuttings, and desired results. Typically, a weight ratio of water to cuttings ranges from about from 30:70 to about 80:20 or preferably from 40:60 to about 70:30.

The contact and mixing conditions for the cuttings and wash solution differ depending upon the reactants and other conditions employed. That is, any convenient conditions may be employed so long as the drill cuttings are adequately remediated. Typically, the contact time for the cuttings and wash solution are such that any hydrocarbons float to the surface.

The mixing time also varies depending upon the equipment, reactants, and other conditions employed. Generally, mixing time is less at higher temperatures. At typical or ambient temperatures using a conduit and open vessel, the residence time of the cuttings in the wash solution is usually at least about 1 minute, or at least about 3 minutes, or at least about 5 minutes, up to about 60 minutes, or up to about 45 minutes, or up to about 30 minutes.

After mixing, the treated drill cuttings are removed from the initial processing vessel by any convenient means. The cuttings can then be moved to another tank, a dewatering device or disposed. Often, drill cuttings may be landspread on site or even used as a road base or filler. In this manner, substantial transportation costs are advantageously avoided. Any water employed may be pumped into a tank where it can be oxidized, filtered, or otherwise treated chemically or physically as described below. In this manner, water is advantageously recycled and can be used in this process, stored, or used in another process. Specifically, the water may be used as spud mud for a subsequent job, dust control, equipment wash down, etc. Similarly, the small waste stream may be decanted or removed from the solution. Typically, this removal may be completed within 10-30 minutes or more after any oxidizing step.

The emulsion employed may vary depending upon the reactants, equipment, and conditions employed, as well as, the desired results. The specific emulsion is not particularly critical so long as it usually results in cleaning of the drill cuttings and often also results in a substantial portion of the hydrocarbons floating to the surface in a substantially foam-like layer formed at the surface of the wash solution. Typically, the emulsion comprises one or more oil-liquid membranes surrounding a nano scale compound of iron, magnesium, or both. In many instances it is preferable that the emulsion comprises one or more food grade plant oil-liquid membranes surrounding a nano scale compound of iron, magnesium, or both.

The nano scale compound of iron, magnesium, or both may be any that is capable of being encapsulated, i.e., surrounded, by one or more oil-liquid membranes. The nano scale compound is typically selected from the group consisting of chelated iron, chelated magnesium, iron/magnesium, zero valent magnesium, zero valent iron, or a mixture thereof. By nanoscale is meant particles wherein the mean diameter of the metal particles is at least about 50, or at least about 75, or at least about 100 nm up to about 600, or up to about 500, or up to about 400nm. By "food grade plant oil-liquid membrane" is meant a substantially hydrophobic membrane comprised of biodegradable surfactant and biodegradable oil. In this manner, when water is employed with biodegradable surfactant, biodegradable oil, and the nanoscale compound, then an aqueous emulsion is formed.

The aforementioned aqueous emulsions may be prepared in any convenient manner. Typically, an emulsion is made by first acquiring or making a metal compound, i.e., emulsion precursor. For example, a chelated iron precursor is prepared by mixing nanoscale chelated iron, water, and a chelating agent and heating it to form a slurry. A chelated magnesium precursor may be made by mixing water, base such as sodium hydroxide, and nanoscale magnesium. An iron/magnesium precursor may be made by mixing nanoscale magnesium, hot iron, and one or more surfactants such as polysorbates and/or fatty acid esters such as sorbitan esters. Similarly, a zero valent magnesium precursor may be made by mixing water, a base such as sodium hydroxide, nanoscale zero valent nanoscale magnesium, and one or more surfactants such as polysorbates and/or fatty acid esters such as sorbitan esters while zero valent iron precursor may be made by mixing water, a mineral acid, nanoscale zero valent iron, one or more surfactants such as polysorbates and/or fatty acid esters such as sorbitan esters.

Once the metal precursor is formed it is typically added by itself or with other precursors to non-ionic surfactants and emulsifiers with vigorous mixing. The type and amount, if any, of added surfactants and emulsifiers depends in many cases on the amount in the precursor(s). A particularly preferable emulsifier may include alkylamine linear alkyl aryl sulfonates. The type and amount of metal compound in the emulsion varies depending upon target contaminate(s) of the wastewater. Typically, the weight of the metal compound in the emulsion is at least about 0.05, or at least about 0.08, or at least about 0.1 weight percent based on the total weight of the emulsion. On the other hand, the weight of the metal compound in the emulsion is not so much that it would interfere with the treatment process or cause significant environmental issues. In most cases, the weight of the metal compound in the emulsion is less than about 15, or less than about 8, or less than about 5, or less than about 3 weight percent based on the total weight of the emulsion.

A particularly useful emulsion may be prepared by encapsulating a nanoscale $Mg_2FeH_6$ into an emulsifier and water to form an intermediate. The intermediate may then be mixed with one more linear anionic surfactants to form the emulsion.

Methods of making emulsions of zero-valent iron are described in, for example, U.S. Pat. No. 6,664,298 which is incorporated herein by reference. Typical oil-liquid membranes may be formed by any convenient ingredients so long as the metal compound is isolated from oxygen in water carrier. This can be done by, for example, utilizing chemical and high impact blending of Tween 80™ (polysorbate 80), Tween™ 20 (polysorbate 20), and/or Span™ 85 (Sorbitan Trioleate). This is then mixed with water and nanoscale chelated iron, chelated magnesium, zero valent magnesium, zero valent iron, or iron/magnesium to form hydrophobic emulsion droplets (micelles) that are infused into a hydrophilic emulsion droplet from, for example, modified linear anionic surfactant further mixed with a nonionic surfactant such as Tomadol™ 1200. Suitable anionic surfactants may include, for example, alpha-sulphonated methyl esters from a suitable vegetable oil, palm oil, soy oil, or hydrocarbon oil. Suitable hydrocarbon oils include synthetic, olefin, esters, non-water soluble alcohols such as 2-ethyl hexanol and the like. In this manner, the emulsion is often miscible with the targeted compounds in the drill cuttings.

Using the instant description the skilled artisan can formulate an emulsion based on the desired specific contaminants to be reduced or eliminated from the cuttings. While not wishing to be bound to any particular theory it is believed that the above-described emulsion temporarily protects the nanoscale compound from oxidizers. It is believed that chlorinated volatile organic compounds diffuse through the oil membrane and undergo abiotic reductive dechlorination in the presence of, for example, the nano scale compound of iron, magnesium, or both in the interior aqueous phase. That is, encapsulating the nano scale compound of iron, magnesium, or both in a hydrophilic membrane protects the nanoscale metal compound from oxygen and other ground-water constituents such as inorganics that might foul its reducing capabilities. In this manner, the composition of the wastewater solution may be altered based on the TDS levels and final characteristics desired.

The emulsion is contacted with the cuttings as described above and this often causes hydrocarbons to float forming a substantially foam-like layer at the surface of the mixture. If desired, an oxidizing agent may be employed by, for example, supplying an oxidizing agent such as oxygen in the form of, for example, by applying a feed, e.g., continuous or via one or more bursts, of air, ozone, peroxide, or other oxygen containing gas. Other oxidizing agents may also be employed in the present invention in gas or powder form. For example, an anionic component of a salt such as, for example, metal salts of chromates and dichromates, chlorates and perchlorates, nitrates, perborates, perchloric acid (below 70% concentration) and hydrogen peroxide. Also, salts such as alkali or alkaline earth metal salts of hypochlorite, permanganate, and peroxide may be employed such as chromium trioxide, hydrogen peroxide, halane, and nitric acid. A particularly useful agent may be sodium permanganate. Other oxidizers include ammonium dichromate, potassium chlorate, hydrogen peroxide, calcium hypochlorite, sodium chlorate, perchloric acid, sodium chlorite, and potassium bromate. Others may include ammonium perchlorate, ammonium pernitrate, and potassium superoxide.

The process steps and process may be employed batchwise or continuously. Advantageously, the resulting cuttings may have reduced total dissolved solids as much as desired and typically below about 3000, or even below about 500 ppm if desired. That is, the process may be repeated as necessary to obtain the desired reduction in total dissolved solids. The water used in the process can then be treated even further if desired with, for example, a reverse osmosis membrane or other filter media to further enhance its quality.

Advantageously, the process is useful to eliminate the need for expensive treatment, transportation, and disposal of drill cuttings. It can be conducted on site at reduced costs and footprint of current technologies. This reduces or even eliminates the risk of potential spills during storage and/or transportation of cuttings by, for example, ground transport. It also allows for efficient and safe reuse on site or elsewhere.

EXAMPLE 1

Chelated Iron Emulsion

An aqueous emulsion comprising one or more oil-liquid membranes surrounding a nano scale compound comprising chelated iron is mixed. Specifically, chelated iron may be bought or prepared. Suitable chelated iron compounds are usually in the range of from about 6 to about 12% iron chelated with, for example, an amine such as EDTA (Ethylenediaminetetraacetic acid), EDDHA, and/or DTPA. Specific suitable molecular formulas include, for example, C10H12N2O8 FeNa.3H2O, C18H16N2.6FeNa, and DTPA.Fe.HNa.

The chelated iron is next mixed with from about 25 to about 65 weight percent emulsifier and from about 15 to about 50 weight percent non-ionic surfactant and from about 5 to about 35 weight percent of an ester surfactant. Typical emulsifiers include one or more of the following: Branched Dodecyl Benzene Sulfonic Acid, Dioctyl sodium sulfosuccinate, Isopropylamine Branched Alkyl Benzene Sulfonate, Isopropylamine Linear Alkyl Benzene Sulfonate, Linear Alkyl Benzene Sulfonic Acid, Sodium Alpha Olefin (C12) Sulfonate, Sodium Alpha Olefin (C14-16) Sulfonate, Sodium Branched Alkyl Benzene Sulfonate, Sodium Branched Dodecyl Benzene Sulfonate, Sodium Lauryl Sulfate, Sodium Linear Alkyl Benzene Sulfonate, Sodium Linear Alkyl Benzene Sulfonate Slurry, Sodium Linear Alkylbenzene Sulfonate, Sodium Olefin Sulfonate, Sodium Oleic Sulfonate, Triethanolamine Linear Alkyl Benzene Sulfonate.

Useful non-ionic surfactants may include linear ethoxylated alcohols such as those called TOMADOL available from Air Products. Typical ester surfactants may include one or more of the following: Glycerol a-Monostearate, Monomyristin, Monopalmitin, Monostearin, Polyethylene Glycol Monolaurate n≈10, Polyethylene Glycol Monostearate n≈10, Polyethylene Glycol Monostearaten n≈2, Polyethylene Glycol Monostearate n≈25, Polyethylene Glycol Monostearate n≈4, Polyethylene Glycol Monostearate n≈40, Polyethylene Glycol Monostearate n≈45, Polyethylene Glycol Monostearate n≈55, Sorbitan Monopalmitate, Sorbitan Sesquioleate, Sorbitan Monolaurate, Sorbitan Monopalmitate, Sorbitan Monostearate, Sorbitan Monooleate, Sorbitan Sesquioleate, Sorbitan Trioleate, Polyoxyethylene-sorbitan monostrearate, Polyoxyethylene-sorbitan tristeanate, Polyoxyethylene-sorbitan monooleate, Polyoxyethylene-sorbitan monooleate, and Polyoxyethylene-sorbitan trioleate.

EXAMPLE 2

Chelated Magnesium Emulsion

A chelated magnesium emulsion may be made in a substantially similar manner as in Example 1 except that a a magnesium chelate is employed instead of a chelated iron. Suitable magnesium chelates include from about 6 to about 12% magnesium chelated with, for example, EDTA (Ethylenediaminetetraacetic acid) and the like. Other suitable chelated magnesium compounds include EDTA-MgNa.H20.

EXAMPLE 3

Zero Valent Emulsions

Zero valent magnesium, iron, or mixtures of magnesium and iron are made substantially as described in U.S. Pat. Nos. 6,664,298 and 7,037,946 which are incorporated herein by reference.

EXAMPLE 4

Treating Drill Cuttings

Drill cuttings are collected from a drilling rig releasing into a collection vessel from shakers. The drill cuttings have initial chloride levels 10× TCEQ limit and initial oil and grease levels of 22× TCEQ limits. The cuttings are contacted with an emulsion and pumped out of the collections box into a processor where they are mixed with water and gently agitated avoiding substantial introduction of air. Next, air and oxygen are introduced in order to eliminate many contaminates. Typically, the cuttings and wash solution turn a lighter color indicating contaminate removal. The cuttings are then discharged and mixed with soil. Unlike other processes which result in plant death, the land containing the treated drill cuttings may often support plant and tree life.

Surprisingly, the chloride concentration of the cuttings is reduced 99.998% and well below (99.993% below) TCEQ standards. Similarly, oil and grease concentration is reduced 99.999% and well below (99.996% below) TCEQ standards. In fact, as the results below show, 24 different chemicals tested came 98% below TCEQ standards. And nearly all the water may be recycled and no truck hauling of cuttings or landfill disposal is necessary. Processing 2417 barrels of cuttings over a 16 day period resulted in an average of 0.763 ppm oil/grease and 0.896 ppm chlorides as shown below.

| Quantity bbl. | Oil/Grease ppm | Chlorides ppm |
|---|---|---|
| 217 | 0.42 | 1.9 |
| 105 | 0.475 | 0.28 |
| 203 | 0.5 | 0.27 |
| 217 | 0.5 | 0.12 |
| 126 | 0.48 | 1.3 |
| 28 | 4.1 | 1.8 |
| 210 | 0.83 | 0.6 |
| 52 | 4.3 | 0.12 |
| 70 | 0.455 | 0.55 |
| 154 | 0.54 | 0.26 |
| 275 | 0.47 | 0.62 |
| 150 | 0.85 | 0.32 |
| 125 | 0.58 | 0.42 |
| 260 | 1.03 | 0.18 |
| 150 | 0.83 | 0.36 |
| 75 | 1.1 | 0.46 |
| 2,417 | 0.763 | 0.896 |

Figure 5A:
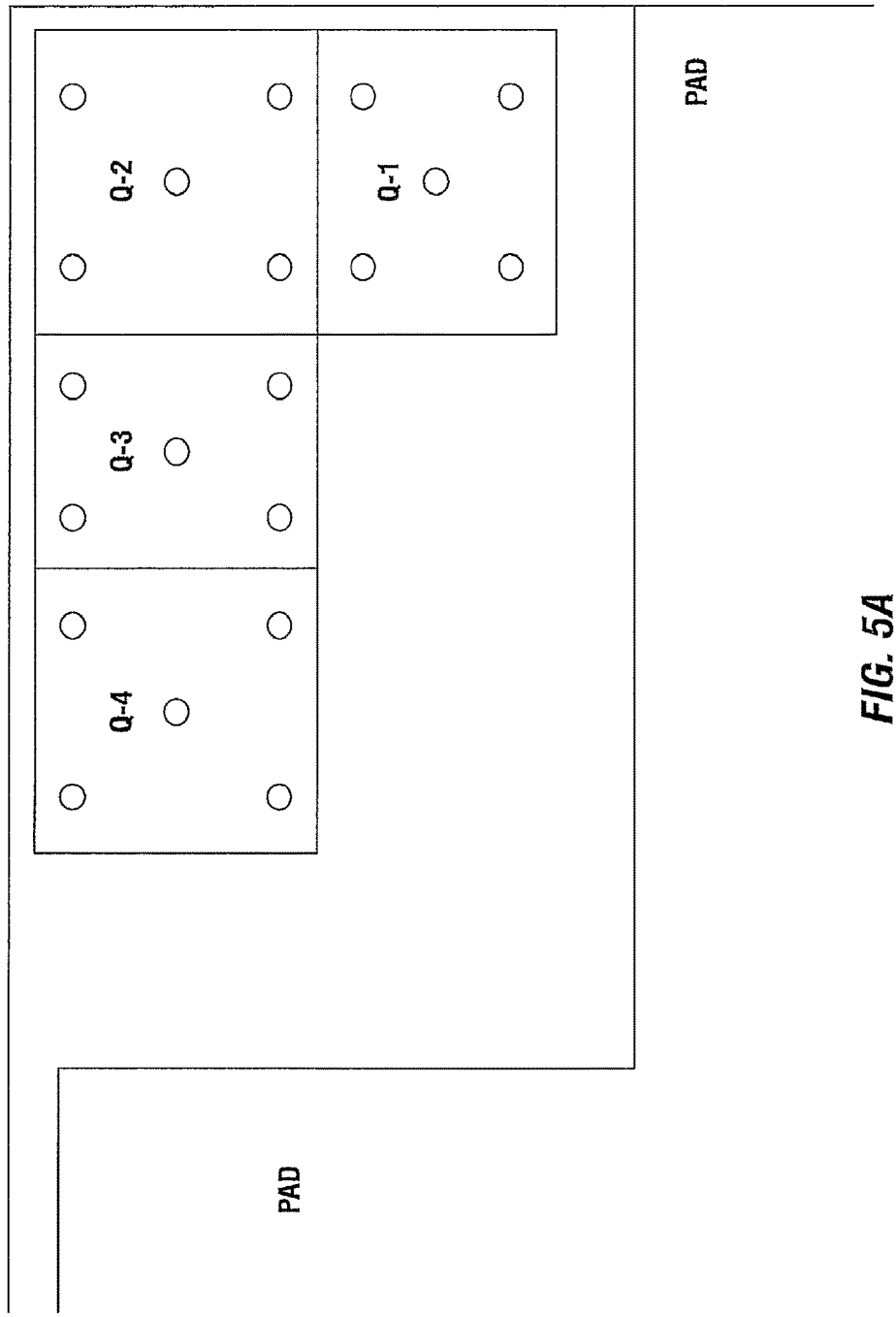
Figure 5D:
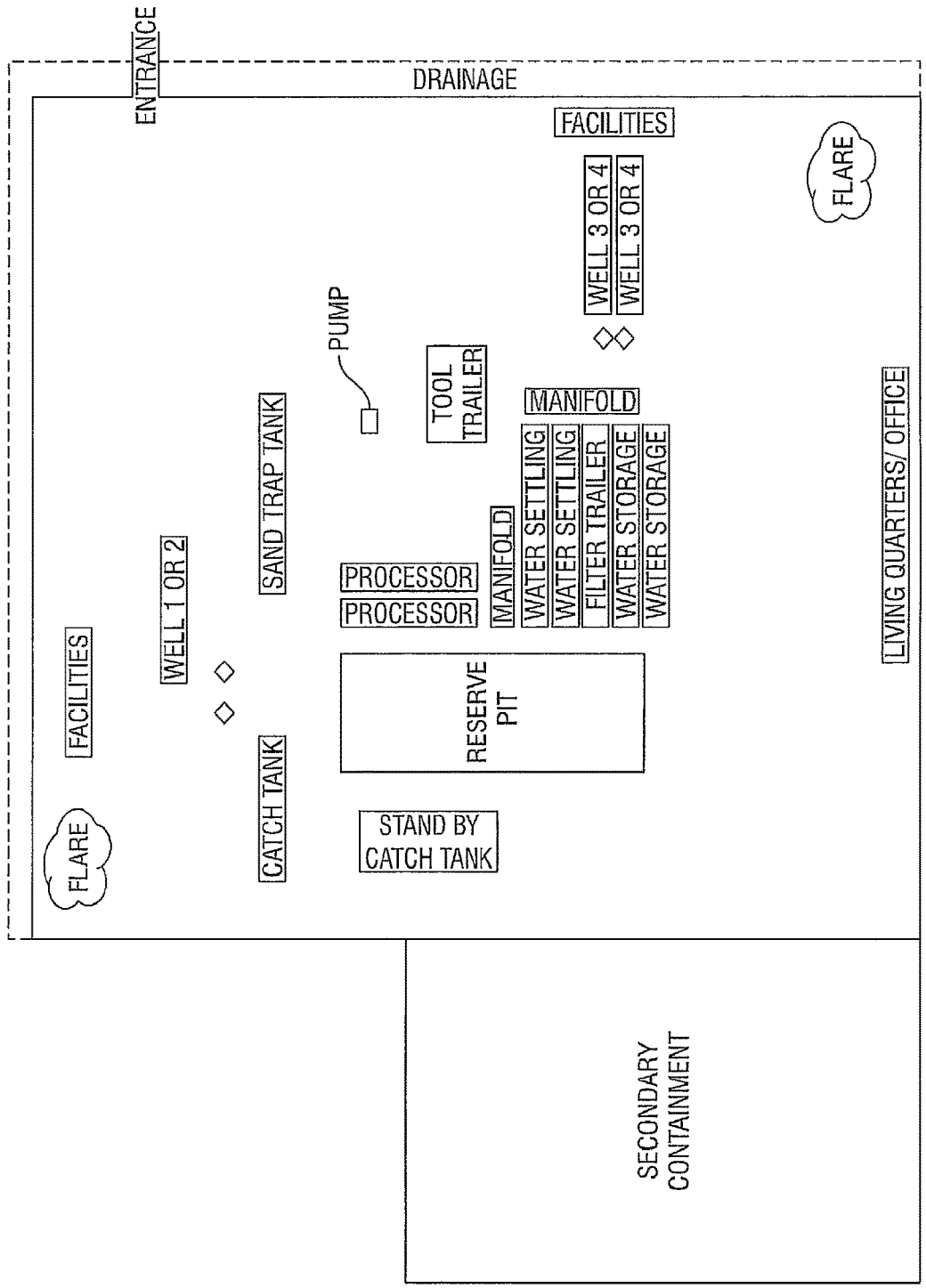
Figure 5E:
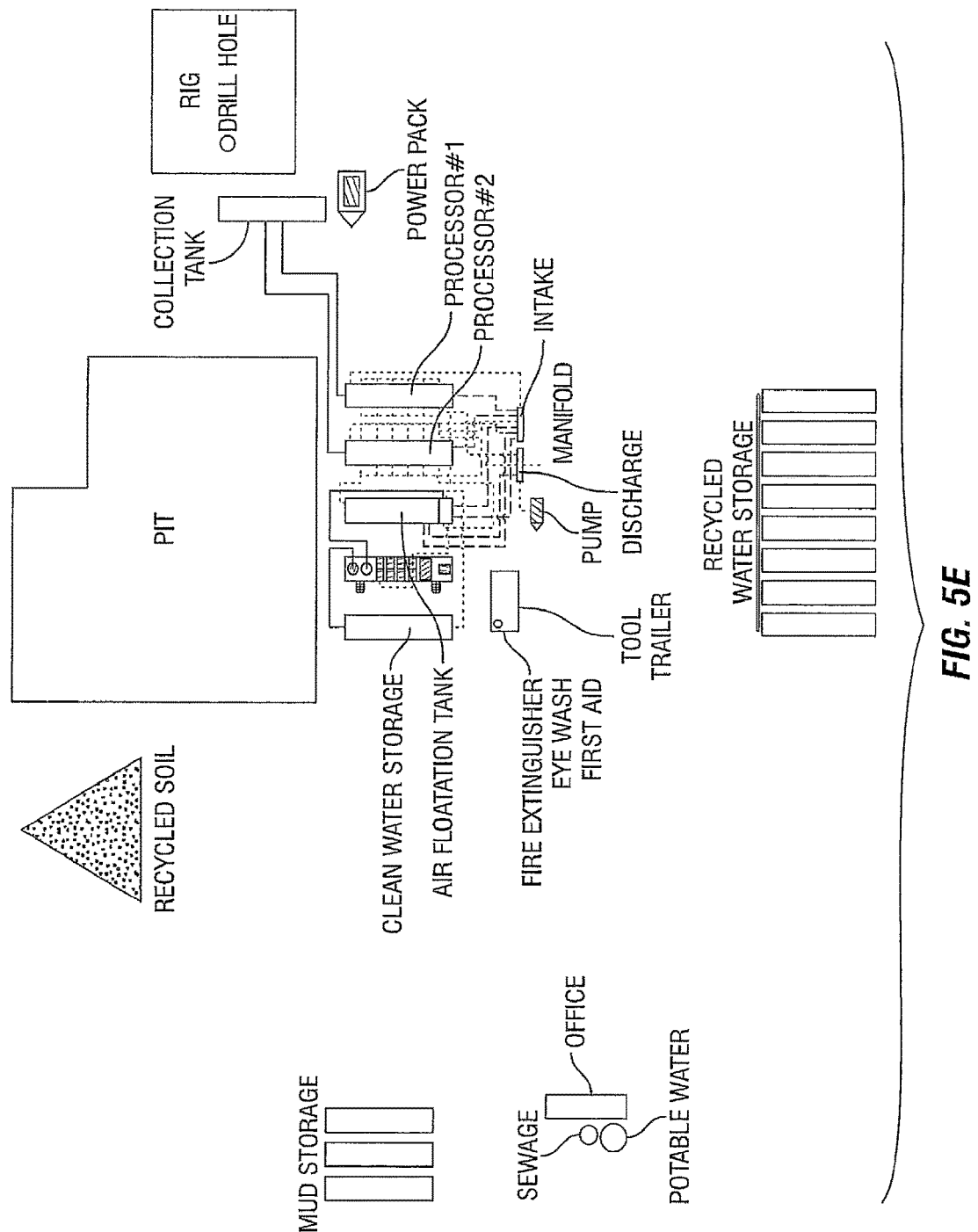
Figures 6A, 6B:
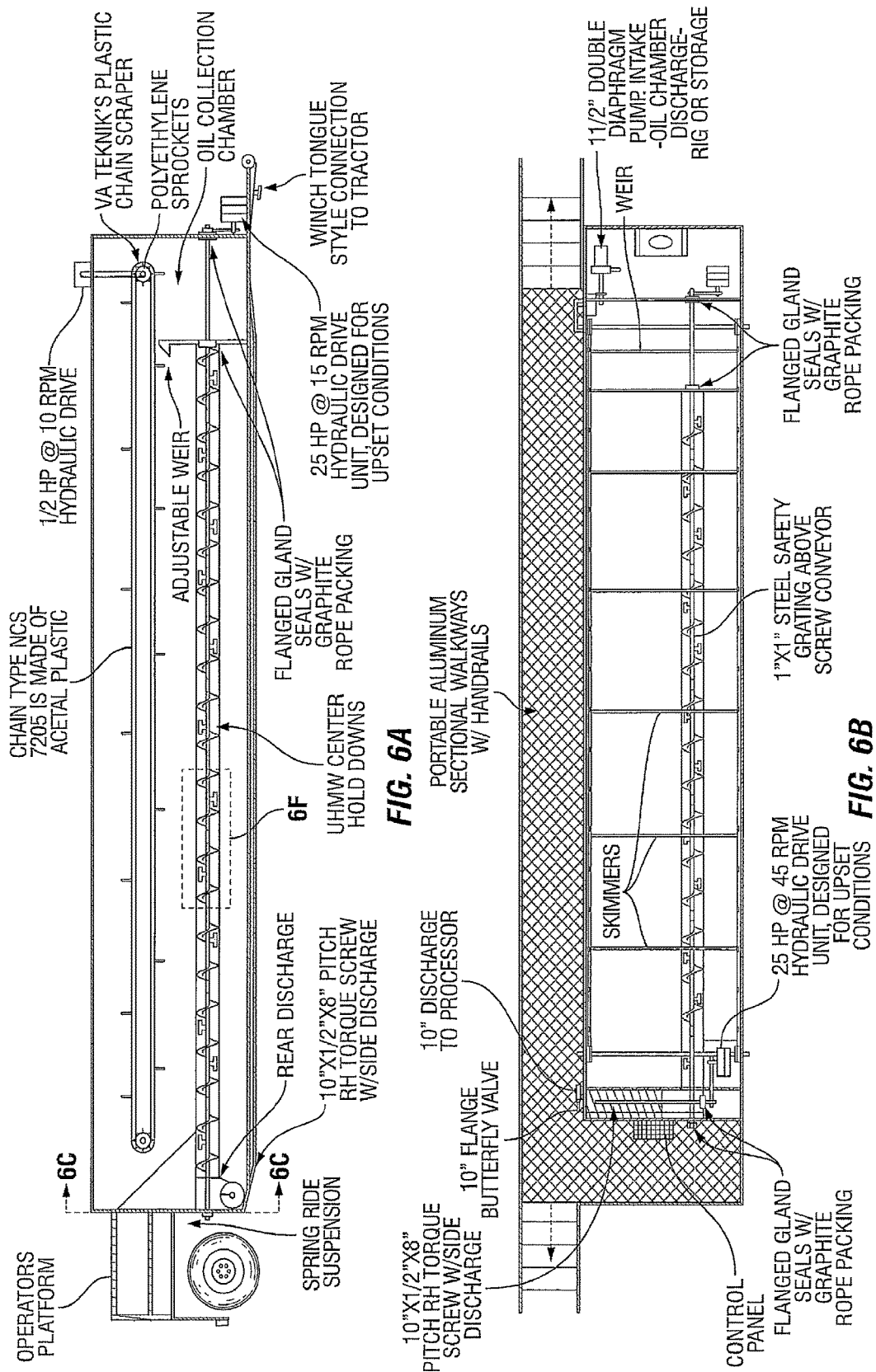
Figure 6E:
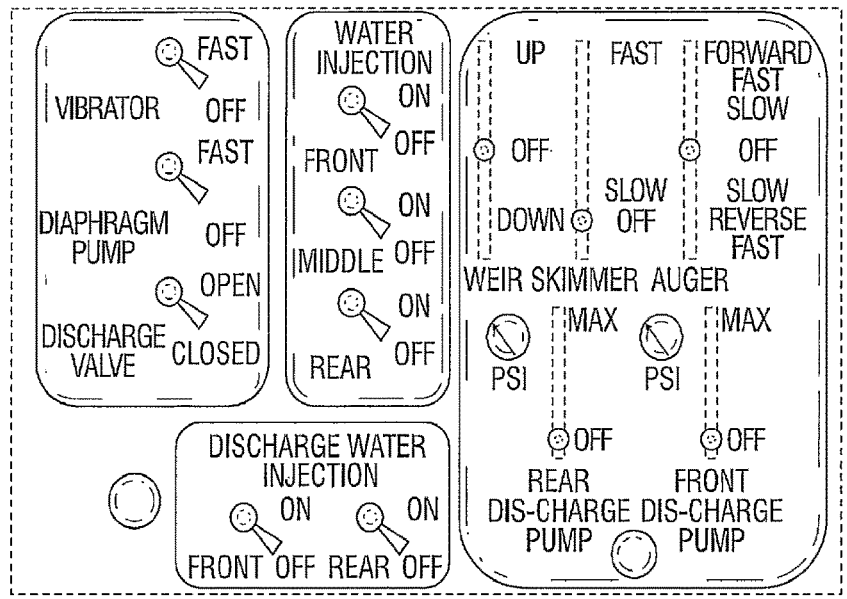
Figure 6F:
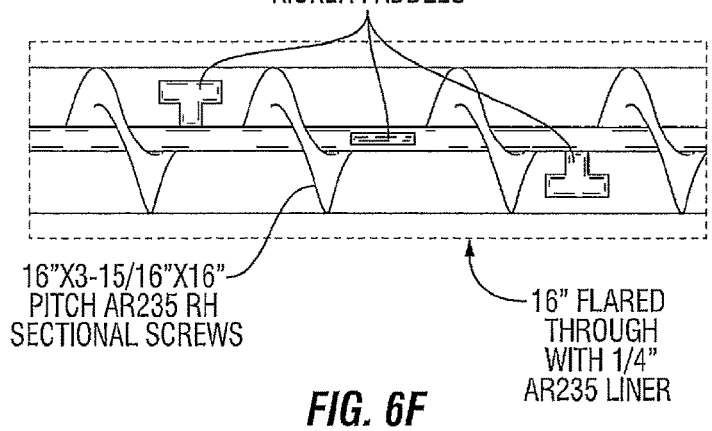
Figure 6G:
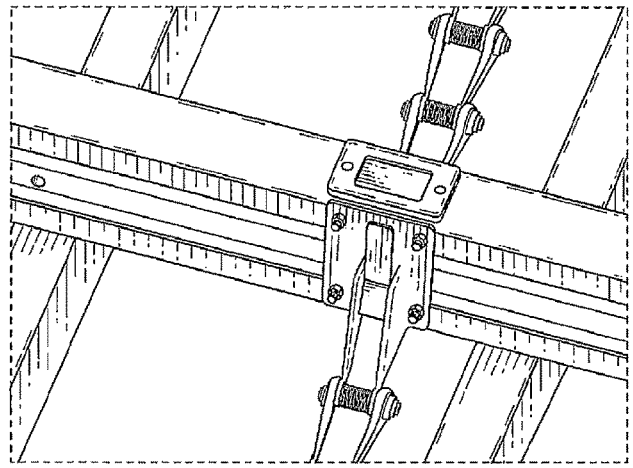
Figure 8A:
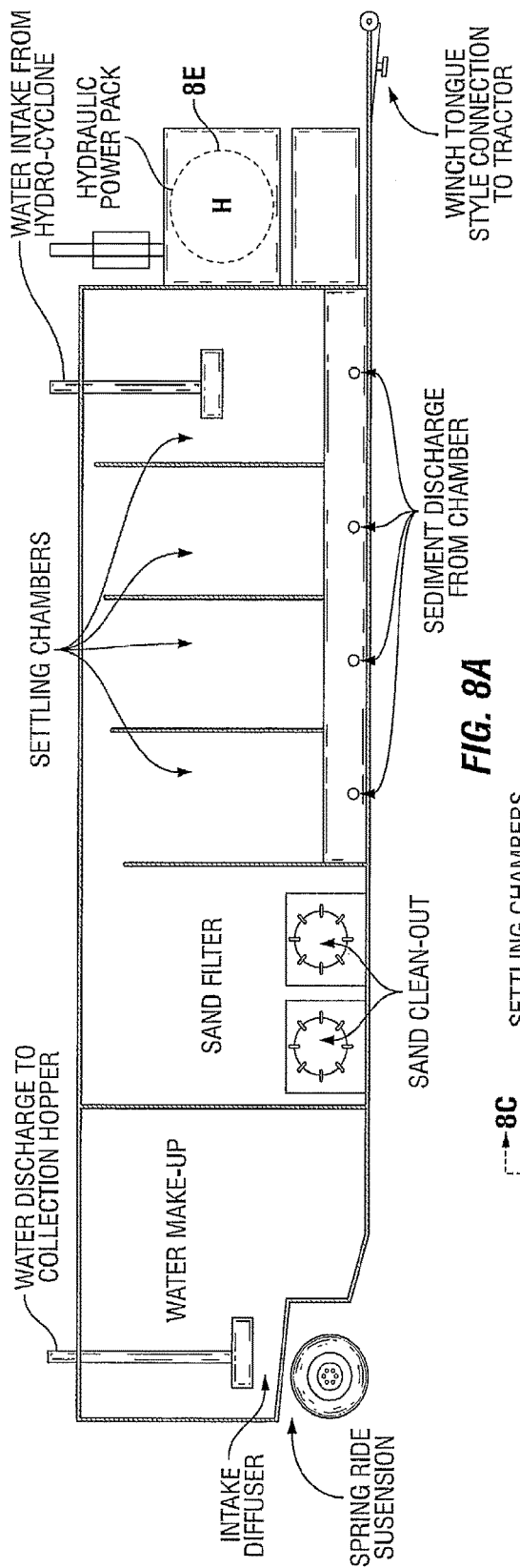
FIGS. 8a-8e show various views of an exemplary settling and water make-up unit.
Figure 8B:
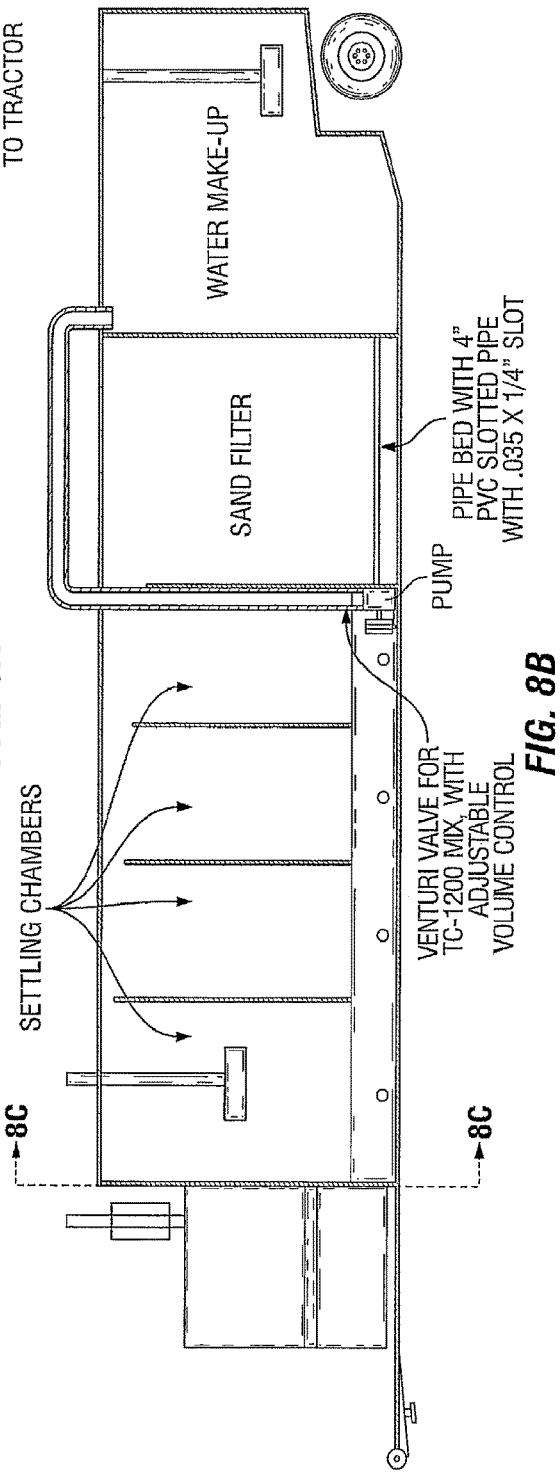
Figures 8C, 8D, 8E:
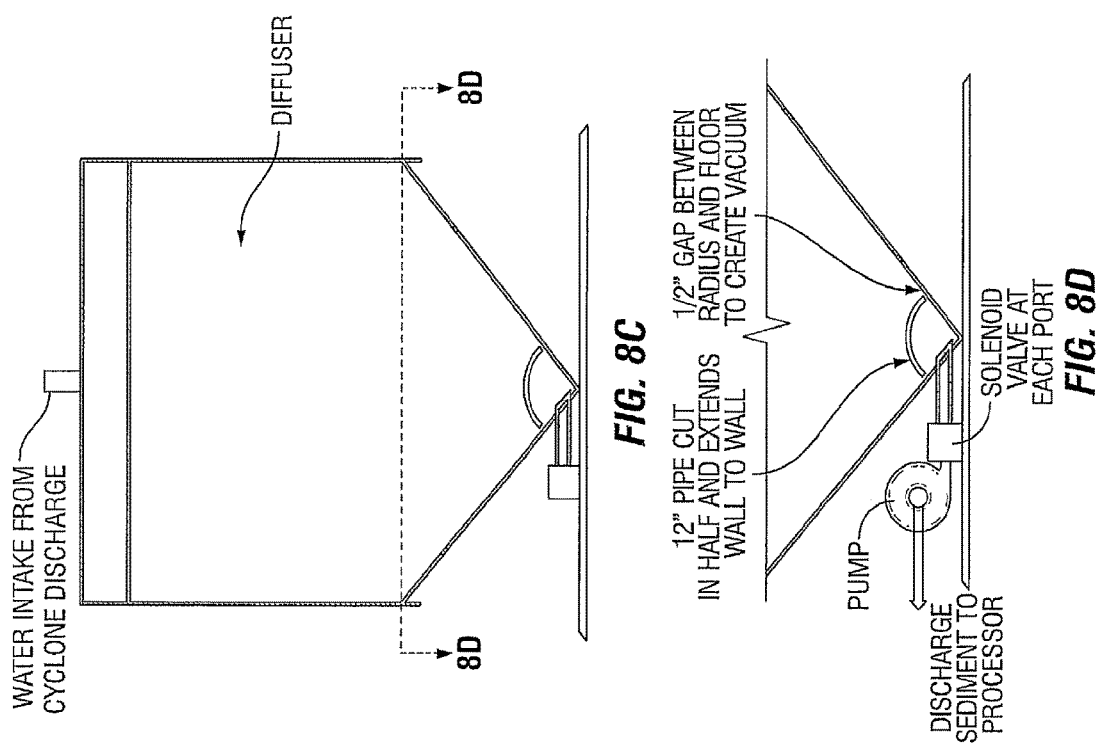
Figure 9:
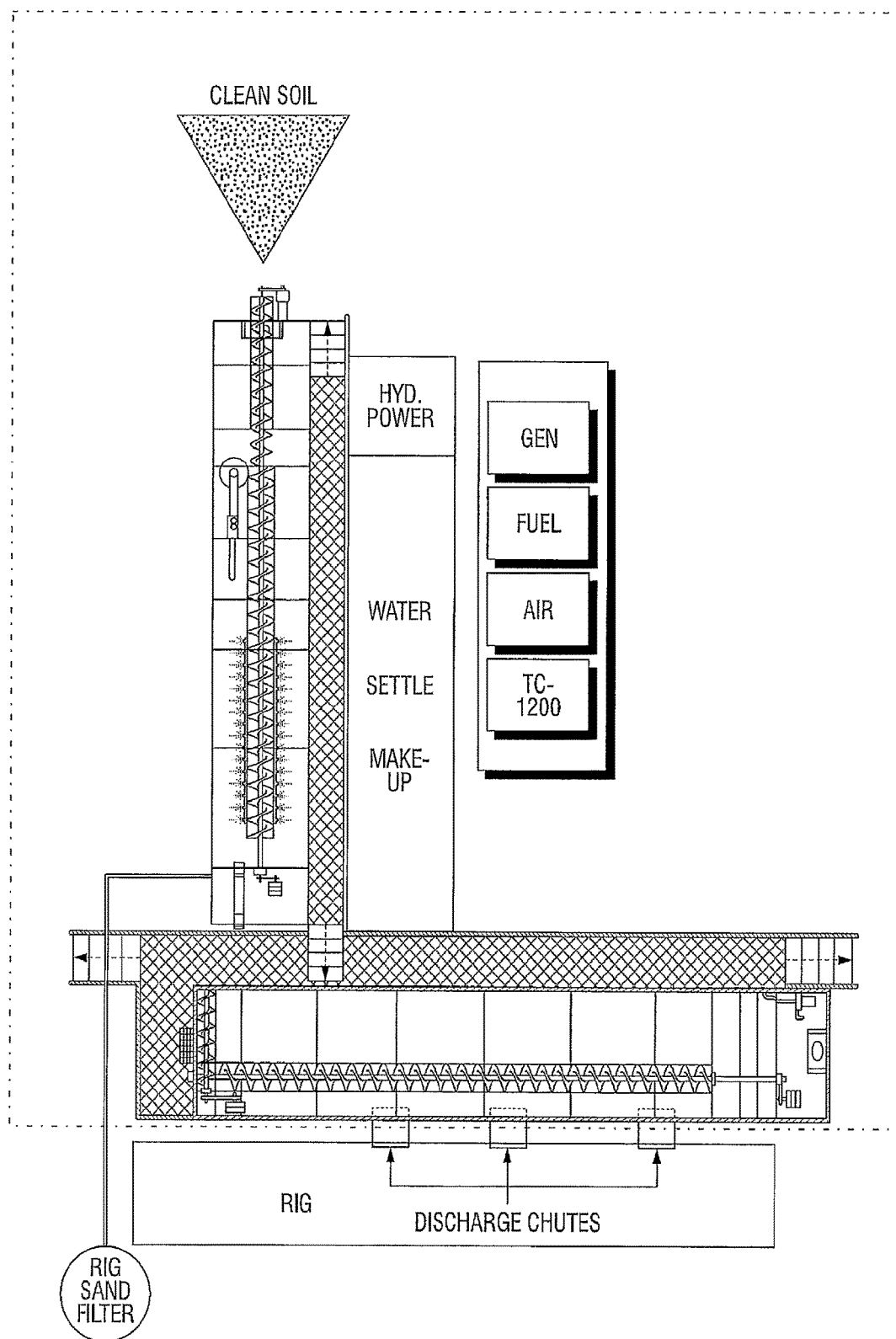
FIG. 9 is an exemplary site layout of various processing equipment.

Further details and results of the experiments are described in FIGS. 5a-5f.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A process for treating drill cuttings from an oil or gas operation wherein the process comprises:
    mixing the drill cuttings with an aqueous emulsion comprising one or more oil-liquid membranes surrounding a nano scale compound comprising iron, magnesium, or both wherein the weight ratio of emulsion to water in the aqueous emulsion is from about 1:150 to about 1:3000 and wherein the volume ratio of water to drill cuttings is from about 40:60 to about 70:30; and
    removing the treated drill cuttings.

2. The process of claim 1 which further comprises removing at least a substantial portion of any floating hydrocarbons.

3. The process of claim 1 wherein the mixing is conducted such that the drill cuttings are not subjected to air.

4. The process of claim 1 wherein the time of contacting and mixing is from about 1 minute to about 30 minutes.

5. The process of claim 1 wherein the process further comprises supplying an oxidizing agent to the during or subsequent to removing of the treated drill cuttings.

6. The process of claim 5 wherein the oxidizing agent is oxygen.

7. The process of claim 6 wherein the oxygen is supplied by applying a feed of air, ozone, peroxide, or other oxygen containing gas.

8. The process of claim 5 wherein the oxidizing agent is selected from the group consisting of metal salts of chromates, dichromates, chlorates, perchlorates, and nitrates, perborates; perchloric acid; hydrogen peroxide; salts of hypochlorite, permanganate, and peroxide; sodium permanganate; chromium trioxide; halane; nitric acid; ammonium dichromate; potassium chlorate; calcium hypochlorite; sodium chlorate; perchloric acid; sodium chlorite; potassium bromate; ammonium perchlorate; ammonium pernitrate; potassium superoxide; and mixtures thereof.

9. The process of claim 1 wherein the process is conducted on a continuous basis.

10. The process of claim 1 wherein the process is conducted on a batch basis.

11. The process of claim 1 wherein the treated drill cuttings comprise less than about 300 ppm chlorides.

12. The process of claim 1 which further comprises treating said removed hydrocarbons to form a dry filter cake.

13. The process of claim 12 which further comprises injecting said dry filter cake into a salt water disposal well.

* * * * *